(12) United States Patent
Carpenter

(10) Patent No.: US 9,365,135 B2
(45) Date of Patent: Jun. 14, 2016

(54) INFANT CAR SEAT BASE WITH SAFETY BELT LOCK-OFF ARM

(71) Applicant: Graco Children's Products Inc., Atlanta, GA (US)

(72) Inventor: Jason Allen Carpenter, Exton, PA (US)

(73) Assignee: Graco Children's Products Inc., Atlanta, GA (US)

( * ) Notice: Subject to any disclaimer, the term of this patent is extended or adjusted under 35 U.S.C. 154(b) by 0 days.

(21) Appl. No.: 14/586,486

(22) Filed: Dec. 30, 2014

(65) Prior Publication Data

US 2015/0183341 A1 Jul. 2, 2015

Related U.S. Application Data

(60) Provisional application No. 61/922,708, filed on Dec. 31, 2013.

(51) Int. Cl.
*B60N 2/26* (2006.01)
*B60N 2/28* (2006.01)

(52) U.S. Cl.
CPC ............ *B60N 2/2821* (2013.01); *B60N 2/2803* (2013.01); *B60N 2/2845* (2013.01); *Y10T 29/49947* (2015.01)

(58) Field of Classification Search
CPC ... B60N 2/2821; B60N 2/2803; B60N 2/2845
USPC .................................................... 297/256.16
See application file for complete search history.

(56) References Cited

U.S. PATENT DOCUMENTS

| 5,567,008 | A * | 10/1996 | Cone, II | B60N 2/286 297/256.16 X |
|---|---|---|---|---|
| 6,508,510 | B2 * | 1/2003 | Yamazaki | B60N 2/2806 297/250.1 |
| 7,163,265 | B2 * | 1/2007 | Adachi | B60N 2/2806 297/256.16 X |
| 7,216,932 | B2 * | 5/2007 | Emmert | B60N 2/2878 297/256.16 X |
| 8,186,757 | B2 * | 5/2012 | Duncan | B60N 2/2806 297/256.16 X |
| 8,262,161 | B2 * | 9/2012 | Fritz | B60N 2/2806 297/256.16 X |
| 8,322,788 | B2 * | 12/2012 | Williams | B60N 2/2806 297/256.16 |
| 8,419,129 | B2 * | 4/2013 | Inoue | B60N 2/2806 297/256.16 X |
| 8,459,739 | B2 * | 6/2013 | Tamanouchi | B60N 2/2806 297/256.16 X |
| 8,573,695 | B2 * | 11/2013 | Van Geer | B60N 2/2806 297/256.16 |
| 2009/0066131 | A1 * | 3/2009 | Hendry | B60N 2/2821 297/256.16 |

* cited by examiner

*Primary Examiner* — Rodney B White
(74) *Attorney, Agent, or Firm* — Sutherland Asbill & Brennan LLP

(57) ABSTRACT

An infant car seat base has a body, a belt path on the body configured to accept a base anchoring strap there along, and a lock-off arm coupled to the body. The lock-off arm is movable between a blocking position and a lock-off position. The lock-off arm, when in the lock-off position, permits a child seat to be attached to the body. The lock-off arm, when in the blocking position, blocks, inhibits, or prevents attachment of the child seat to the body. A base anchoring strap is captured between the lock-off arm and the body of the base when the base is mounted and secured to a vehicle seat.

18 Claims, 8 Drawing Sheets

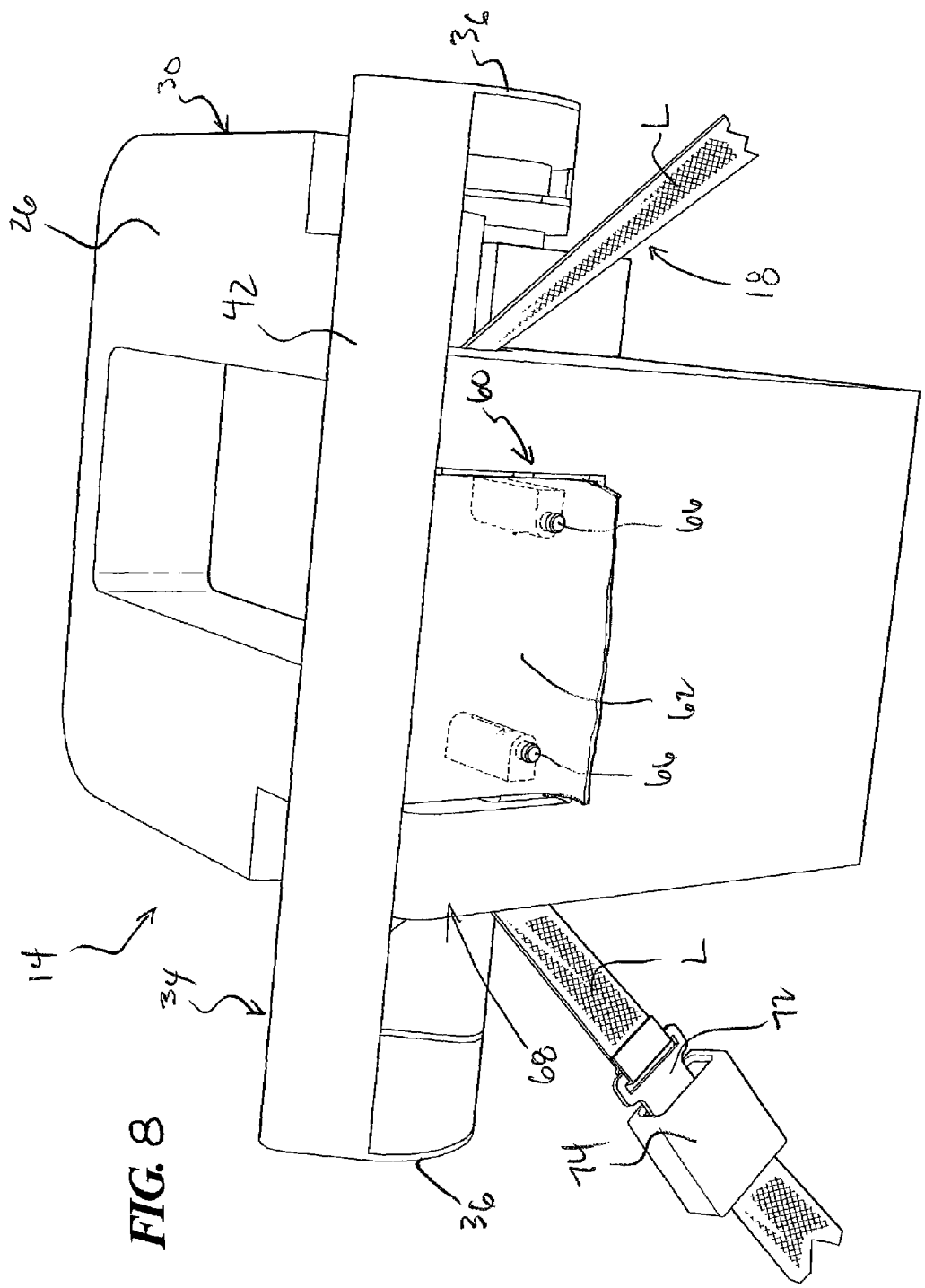

INFANT CAR SEAT BASE WITH SAFETY BELT LOCK-OFF ARM

RELATED APPLICATION DATA

This patent is related to and claims priority benefit of U.S. provisional application Ser. No. 61/922,708 filed Dec. 31, 2013 and entitled "Infant Car Seat Base with Safety Belt Lock-Off Arm." The entire content of this prior filed provisional application is hereby incorporated herein by reference.

BACKGROUND

1. Field of the Disclosure

The present disclosure is generally directed to infant car seats and carriers, and more particularly to an infant car seat with a base having a safety harness lock-off arm that blocks installation of the carrier until in a lock-off position.

2. Description of Related Art

Infant car seats are known in the art. Most infant car seats have a base that secures to a vehicle seat and a seat or carrier that removably mounts on or attaches to the base. Many bases for infant car seats are secured to the vehicle seat by routing a base anchoring strap or belt across a belt bath defined on the base. The base anchoring strap can be a lap belt part and/or shoulder strap part of the vehicle's dedicated safety harness for the seat on which the base is being secured. The base anchoring strap may instead be an anchor strap that is supplied with and secured to the base or at least provided with the infant car seat. Such straps typically connect to fixed anchor points on the vehicle seat.

Some infant car seat bases use or can use the lap belt and sometimes also a portion of the shoulder strap extended across the base and latched to the vehicle belt latch for this purpose. Some infant car seats have lock-off clamps positioned on one side or on both sides of the base. The clamps are used to clamp down on or lock the anchoring strap in place on the base. Car seats for larger children often also use a shoulder belt to secure the seat in place on the vehicle seat. These types of seats also are known to have a lock-off for the vehicle's shoulder belt. This lock-off function is a known secondary feature that is used to squeeze and secure the anchoring belt or strap to the base.

It is known that some users forget to or choose not to utilize the lock-off feature. Known infant car seats still allow the seat or carrier to be mounted on or attached the base, regardless as to whether the lock-off feature is utilized properly or not. It has also been found that child restraint systems, a broader class of seating systems that include infant car seat systems, are often not correctly installed in a vehicle by the end user. One cause is a loose connection between the vehicle seat and vehicle's safety harness system and the seating device or base of the child restraint system or infant car seat.

SUMMARY

In one example according to the teachings of the present disclosure, an infant car seat base has a body, a belt path on the body configured to accept a base anchoring strap there along, and a lock-off arm coupled to the body. The lock-off arm is movable between a blocking position and a lock-off position. The lock-off arm, when in the lock-off position, permits a child seat to be attached to the body. The lock-off arm, when in the blocking position, blocks, inhibits, or prevents attachment of the child seat to the body.

In one example, a lock-off portion of the lock-off arm, when in the lock-off position, can closely overlie the belt path to capture a base anchoring strap therebetween.

In one example, the lock-off arm can be pivotable relative to the body between the blocking position and the lock-off position.

In one example, the lock-off arm can be connected to the body. The lock-off arm can be pivotably raised above the body in the blocking position and can be pivotably lowered closely adjacent to or against the body in the lock-off position.

In one example, a lock-off portion of the lock-off arm can closely follow the contour of at least part of the belt path when in the lock-off position.

In one example, the infant car seat base can include a latch mechanism on the infant car seat base. The latch mechanism can be configured to releasably secure the lock-off arm in the lock-off position closely adjacent to or against the body.

In one example, the infant car seat base can include a latch mechanism on the infant car seat base. The latch mechanism can have a first part on the lock-off arm that can engage a second part on the body when latched and that can disengage from the second part when released.

In one example, the lock-off arm and the belt path can be configured to capture a base anchoring strap between the body and the lock-off arm. The lock-off arm and/or the belt bath can be configured to impart one or more non-linear shapes, curves, bends, or kinks to the base anchoring strap.

In one example according to the teachings of the present disclosure, an infant car seat has a base with a body, a belt path on the body, and a lock-off arm coupled to the body. The lock-off arm is movable between a blocking position and a lock-off position relative to the body. The infant car seat also has a child seat attachable to the base. The lock-off arm, when in the lock-off position, permits the child seat to be attached to the body. The lock-off arm, when in the blocking position, blocks, inhibits, or prevents attachment of the child seat to the body.

In one example, a lock-off portion of the lock-off arm, when in the lock-off position, can closely overlie the belt path and can be configured to capture a base anchoring strap therebetween.

In one example, the lock-off arm can have free ends pivotally connected to opposite sides of the body and a bar extending between the free ends and across the body.

In one example, part of the bar of the lock-off arm can be pivotably raised above the body in the blocking position and can be pivotably lowered closely adjacent to or against the body in the lock-off position.

In one example, a lock-off portion of the lock-off arm is configured to contact at least part of a base anchoring strap when in the lock-off position.

In one example, the infant car seat can include a latch mechanism on the base configured to releasably secure the lock-off arm in the lock-off position closely adjacent to or against the body.

In one example, the infant car seat can include a base anchoring strap positionable to extend along the belt path on the body when the base is mounted to a vehicle seat.

In one example, the lock-off arm and the belt path can be configured to capture a base anchoring strap between the body and the lock-off arm and to impart one or more non-linear shapes, curves, bends, or kinks to the base anchoring strap with the lock-off arm in the lock-off position.

In one example, the infant car seat can include a base anchoring strap that can be a lap belt portion of a safety harness of a vehicle seat.

In one example, the infant car seat can include a base anchoring strap that can be an anchor belt that can be clipped or anchored to child seat anchors of a vehicle seat.

In one example according to the teachings of the present disclosure, a method of installing an infant car seat on a vehicle seat includes positioning a base of the infant car seat on a vehicle seat. The method also includes arranging a base anchoring strap along a belt path on a body of the base. The method also includes moving a lock-off arm coupled to the body of the base from a blocking position, which prevents, inhibits or blocks attachment of an infant seat to the base, to a lock-off position relative to the body, such that the base anchoring strap is captured between the belt path on the body and a portion of the lock-off arm. The method also includes attaching a child seat of the infant car seat to the base.

In one example, the method can include the step of engaging a latch mechanism to secure the lock-off arm in the lock-off position.

BRIEF DESCRIPTION OF THE DRAWINGS

Objects, features, and advantages of the present invention will become apparent upon reading the following description in conjunction with the drawing figures, in which:

FIG. 8 shows a rear view of the base of FIGS. 5 and 6 and depicts a latch mechanism of the lock-off arm in a latched arrangement or position.

DETAILED DESCRIPTION OF THE DISCLOSURE

The disclosed infant car seat and base solves or improves upon one or more of the above noted and/or other problems and disadvantages with prior know child restraint and infant car seat systems. The disclosed infant car seat base can increase the likelihood of proper installation of an infant car seat or other child restraint device in a vehicle. The disclosed infant car seat base will help to assure a secure installation of the infant car seat or seating device in a vehicle by helping to maintain a tight connection between the infant car seat base or device and the vehicle's safety harness system. The disclosed infant car seat base and lock-off arm do so by directing the placement of the attachment belts within the vehicle to lie across an open belt path on the infant car seat base. This allows easy placement of the base anchoring strap, i.e., the lap or lap/shoulder belt of the vehicle harness or the anchor strap, against the infant car seat base. The vehicle's harness system retractor will then remove the slack of the vehicle belt, creating a snug installation. The disclosed lock-off arm will then secure the anchoring strap or straps in this snug arrangement. Only then will the lock-off arm permit the end user to properly install the seat or carrier on the infant car seat base. These and other objects, features, and advantages of the present invention will become apparent to those having ordinary skill in the art upon reading this disclosure.

Figure 1:
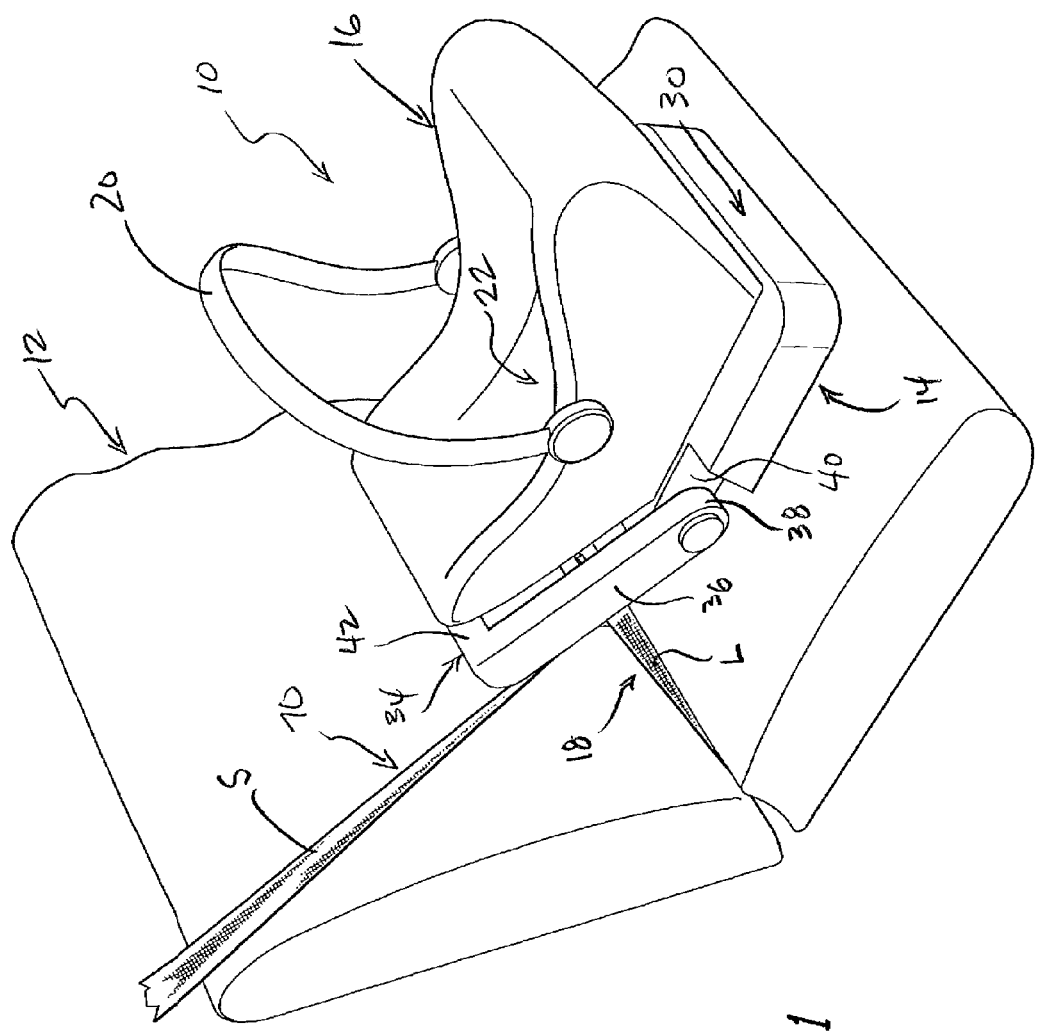
FIG. 1 shows a perspective view from one side of one example of an infant car seat constructed in accordance with the teachings of the present disclosure and resting on and secured to a vehicle seat.
Figure 2:
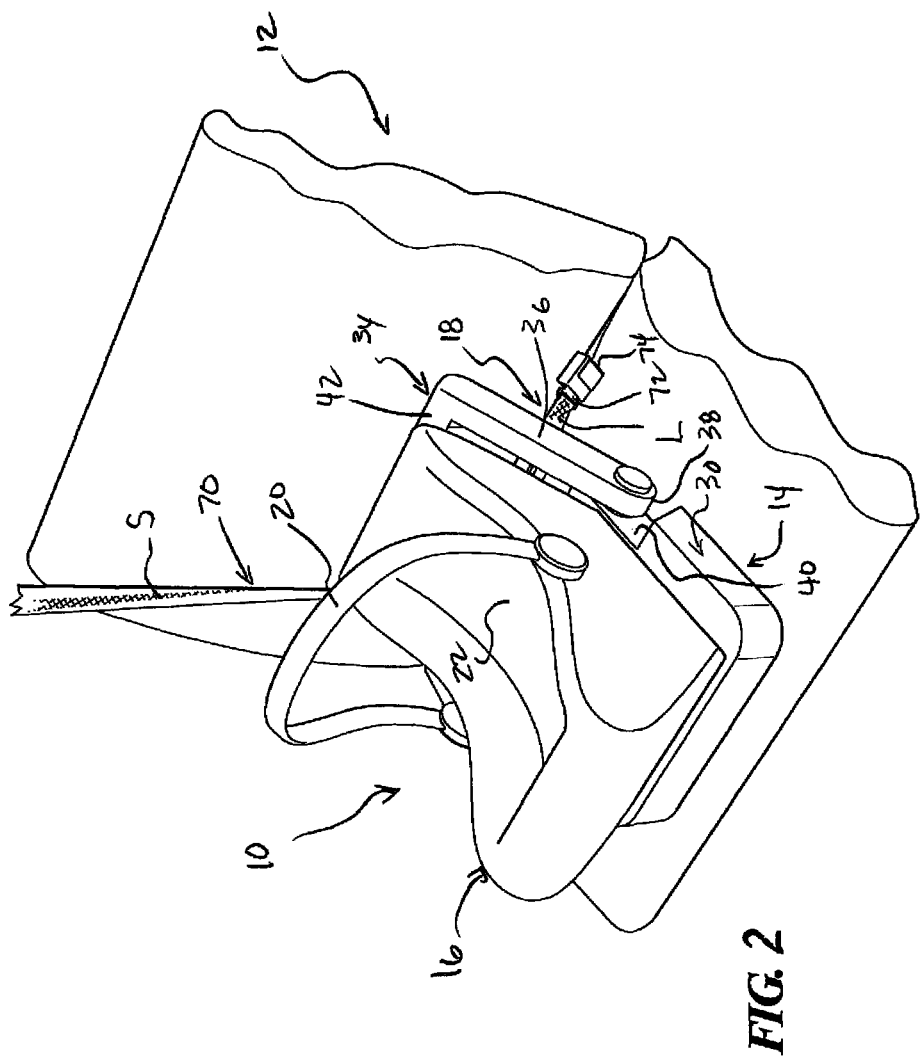
FIG. 2 shows a perspective view from the opposite side of the infant car seat and vehicle seat shown in FIG. 1.
Figure 3:
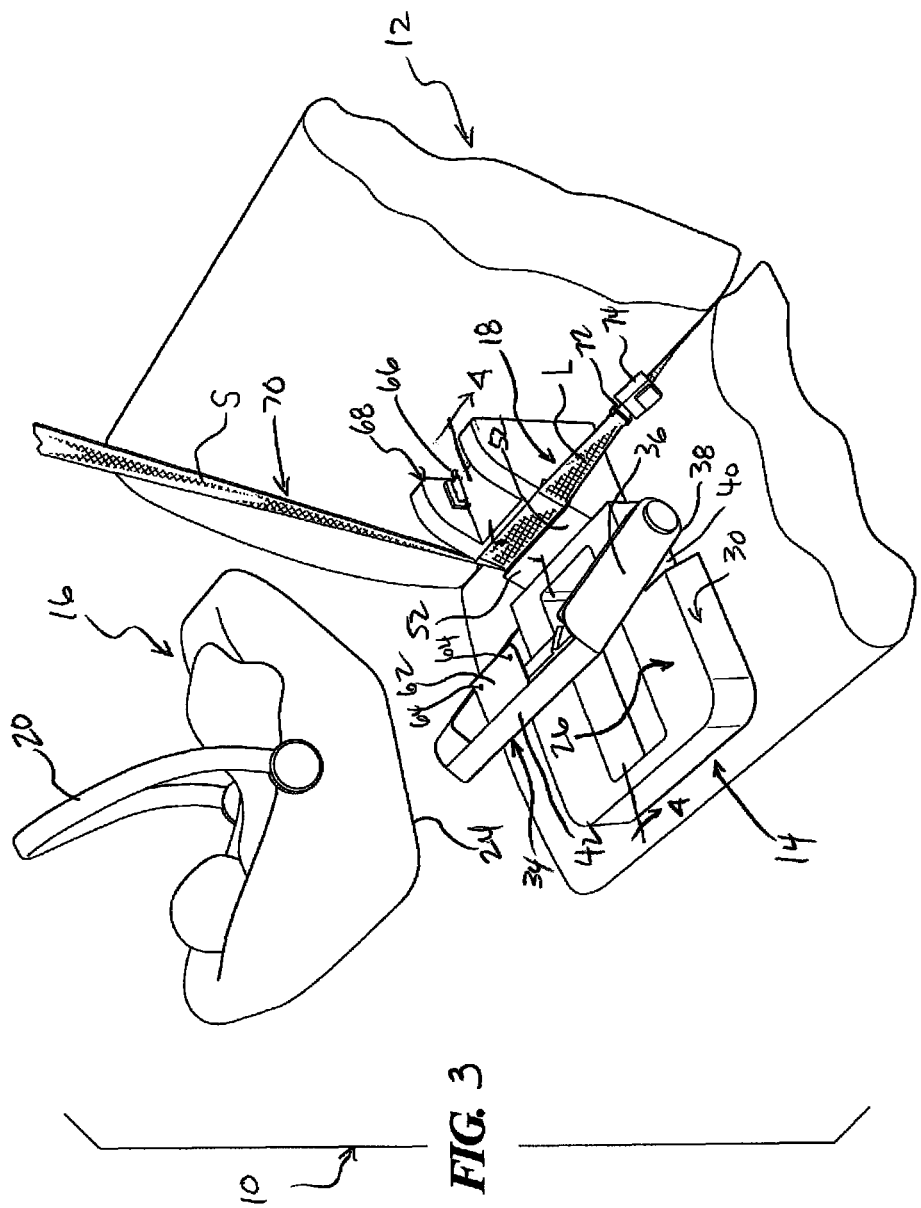
FIG. 3 shows an exploded view of the components of the infant car seat of FIGS. 1 and 2 and shows a lock-off arm of the base in a blocking position and the base secured to the vehicle seat.

Turning now the drawings, FIGS. 1 and 2 show one example of an infant car seat 10 constructed in accordance with the teachings of the disclosure. The infant car seat 10 is depicted as being mounted on and secured to a vehicle seat 12 in FIGS. 1 and 2. The infant car seat 10 is depicted herein rather generically to assist in making the description simple and straightforward. FIG. 3 shows an exploded view of the infant car seat 10. The infant car seat 10 generally has a base 14 and an infant seat 16, which is commonly referred to as an infant carrier. The infant car seat 10 also has a base anchoring strap 18 that secures the base 14 to the vehicle seat 12, as discussed in further detail below. The infant seat 16 typically has a carrying handle 20 that extends up and over the seating surface 22 of the seat. A bottom 24 of the infant seat 16 is configured to attach to a top side 26 of the base 14.

Many characteristics and aspects of the infant seat 16, the base 14, and the vehicle seat 12 are not discussed herein. These characteristics and aspects are not of particular importance to the disclosure, are well known in the art, and/or can vary among the myriad different seat and base designs. One example includes the construction and configuration of the seat and base. These can be one-piece molded plastic components or multiple piece assembled components. Another example includes the components employed to permit attachment and detachment of the seat to and from the base. These latching and release components are not described herein. The disclosed infant car seat can incorporate a wide range of such components without departing from the scope of the invention. Only those aspects and characteristics of the infant car seat 10 that are relevant to the disclosure are discussed in any detail herein.

Figure 4:
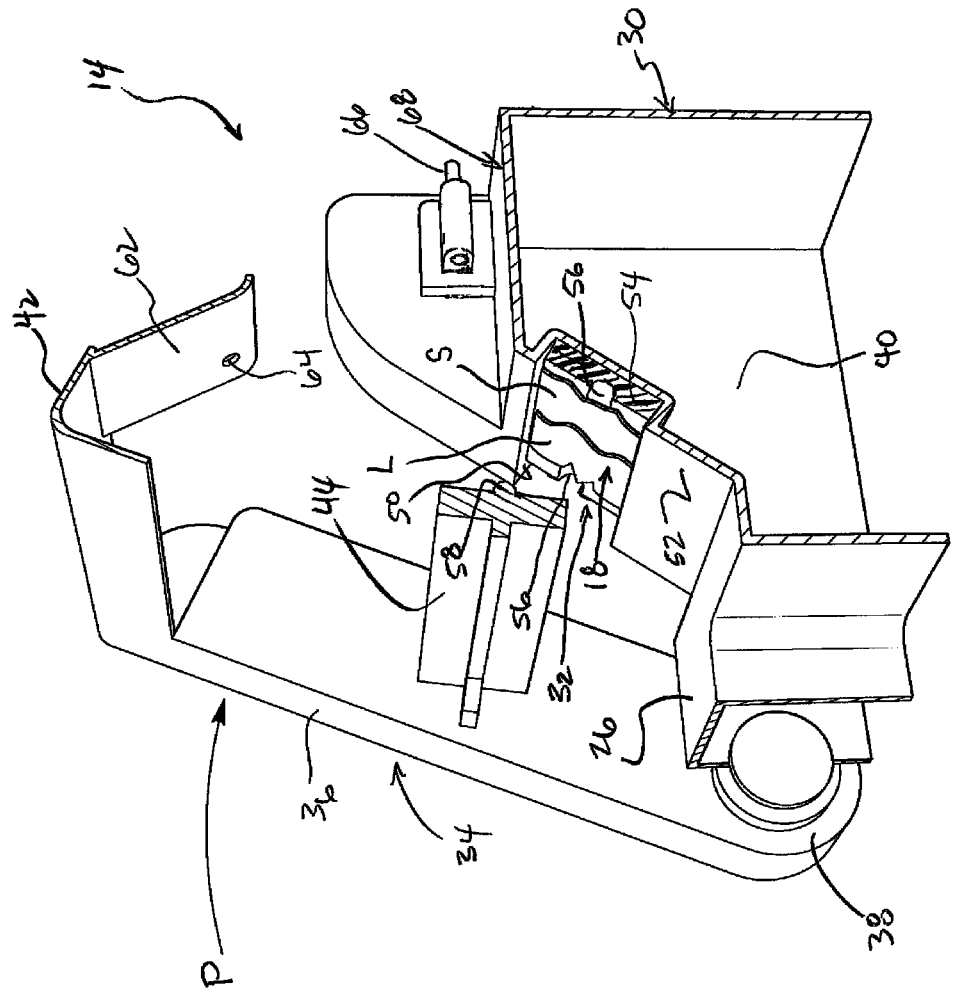
FIG. 4 shows a cross-section of the base taken along line 4-4 of FIG. 3 and with the lock-off arm between a blocking position and the lock-off position of FIGS. 1 and 2.

FIG. 4 shows a cross-section of the base 14 from FIG. 3. The base 14 in the disclose example has a body 30 that defines a belt path 32 across and along the top side 26. The base 14 also has a lock-off arm 34 coupled to the body. The lock-off arm 34 has an inverted U-shape in this example. The lock-off arm 34 has a pair of side elements 36 (see FIG. 3 as well). Each side element 36 has a distal or free end 38 that is pivotally connected at pivot hubs 39 to opposite sides 40 of the body 26. Each side element 36 in this example has a U-shape in cross-section. The proximal ends of the side elements 36 are connected by a bar 42 across the base (also see FIG. 3 as well). In this example, the bar 42 is L-shaped in cross-section. A lock-off or clamping portion 44 of the lock-off arm 34 extends between the side elements 36 below and spaced from the bar 42 in this example. The lock-off arm 34 is pivotable between a lock-off position (depicted in FIGS. 1 and 2) and a blocking position (depicted in FIG. 3). The lock-off arm 34 can be pivoted in the direction of the arrow P of FIG. 4 to move to the lock-off position and in the opposite direction to move to the blocking position.

In the blocking position shown in FIG. 3, the lock-off arm 34 is raised with the bar 42 spaced upward from the body 30 of the base 14. In this blocking position, the lock-off arm 34, and particularly the bar 42 in this example, is positioned over the top side 26 or mounting surface of the base 14. The lock-off arm 34 thus can inhibit, prevent, or block one from lowering the infant seat 16 or carrier onto the base 14. In this example, this is because the lock-off arm 34 traverses the width of the base. In this configuration, the infant seat 16 or carrier cannot be installed on the base 14.

The base body 30 and lock-off arm 34 and its various features and components can vary from the disclosed example. The body 30 and lock-off arm 34 can be molded plastic or can be fabricated from other suitable materials as desired. The lock-off arm parts may be L-shaped, C-shaped, or U-shaped and/or have some other shape or shape combinations when viewed in cross-section. Alternatively, the lock-off arm or just the side elements, bar, or portions thereof can be solid in cross-section. The shape of the lock-off arm 34 need not be U-shaped and instead can have another shape, as desired. In one alternative example, the lock-off arm may have only one pivot joint or hub at only one side of the base body 30. The lock-off arm can nest in a pocket provided on the top side of the base, can rest directly on top of the base, or can nest along a perimeter of the base at a level even with or below the level of the top side. The configuration and construction of the base body and lock-off arm can vary within the spirit and scope of the present disclosure.

FIG. 4 also shows the belt path 32 on the base body 30. In this example, the belt path 32 is a recessed groove 50 extending across a face 52 of the top side 26 on the body 30. In this example, the face 52 is angled or tilted slightly forward to coincide with the angle of the applied force of the base anchoring belt (see FIG. 3), when secured as described below. The belt path 32 can optionally include a friction enhancing material layer 54, such as a rubber, silicone, or other material with a tacky surface placed within the groove 50. In the disclosed example, the groove surface or the material layer surface can include one or more slots 56 that extend lengthwise along the groove or widthwise (see protrusion 59 in FIG. 5) across the groove. The slots 56 can coincide with one or more like-oriented protrusions 58 provided on a surface of the clamping portion 44 of the lock-off arm 34. The slot(s) and protrusion(s) can cooperate with one another to create one or more non-linear shaped breaks, curves, bends, or kinks in the base anchoring strap 18, as discussed below. If the belt path 32 does not include the friction enhancing material 54, the slot(s) 56 can be provided directly in the surface of the groove 50. Also, the slot(s) and protrusion(s) can be reversed with the slot(s) provided on the clamping portion 44 and the protrusion(s) provided in the groove 50. Further, the belt path 32 on the face 52 of the base 14 can be flat or curved across the width of the base, as desired. Still further, belt path 32 can be delineated visually with a line or a color on the face 52, can be delineated by the groove 50, or both. Each side of the infant car seat base can have a physical strap router (not shown) that can help to guide and hold the shoulder belt portion S of the base anchoring strap 18 to lie against the lap belt portion L until installation of the infant car seat 10 is complete.

The base 14 can also include a latching mechanism 60 that can secure the lock-off arm 34 in the lock-off position, also as described below in more detail. In this example, the latching mechanism 60 can include a first part carried on the lock-off arm 34 and a second part carried on the base 14. In this example, the first part is a flexible, resilient tab 62 protruding down from the bar 42 on the lock-off arm 34. The tab 62 has a pair of latch holes or receivers 64 formed therein. The second part includes a pair of latch pins 66 provided on the based. The latch pins 66 in this example are received in the receiving holes 64 in the tab 62 when latched. The latch pins can be simple bosses or protrusions integrally molded as part of the base 14. The latch pins 66 can instead be separate elements attached to the base. Alternatively, the latch pins can be more elaborate spring biased pins mounted to the base, if desired. Still further, the latch pins can be slidable latch bolts that are manually movable. Such latch bolts can be rotatable to lock or release the bolts and slidable when released to a latching position or a retracted non-latching position. The slide bolts can be slidable outward to the latching position, when desired.

The latching mechanism 60 can also be an optional feature of the base 14. The latching mechanism can be provided to secure the lock-off arm in the lock-off position. However, the lock-off arm can simply lie in the lock-off position against or closely adjacent the base 14 without being physically secured in position. Once the infant seat 16 is installed, the lock-off arm 34 can instead or in addition be configured so as to be prevented from being moved from the lock-off position. The configuration and construction of the latching mechanism 60 can also vary from the example shown and described herein. The latching mechanism can be a simple mechanical detent device, a manual push or pull to lock or turn to lock mechanism or some other type of suitable locking mechanism. In this example, the base 14 has an upward extending stand-off 68 with a front side and a back side. The front side of the stand-off 68 can create the face 52 on the body 30 of the base. The back side of the stand-off 68 can define or provide all or part of one part of the latching mechanism 60. The lock-off arm 34 can surround or partly surround the stand-off 68 in the lock-off position, if desired.

Figure 5:
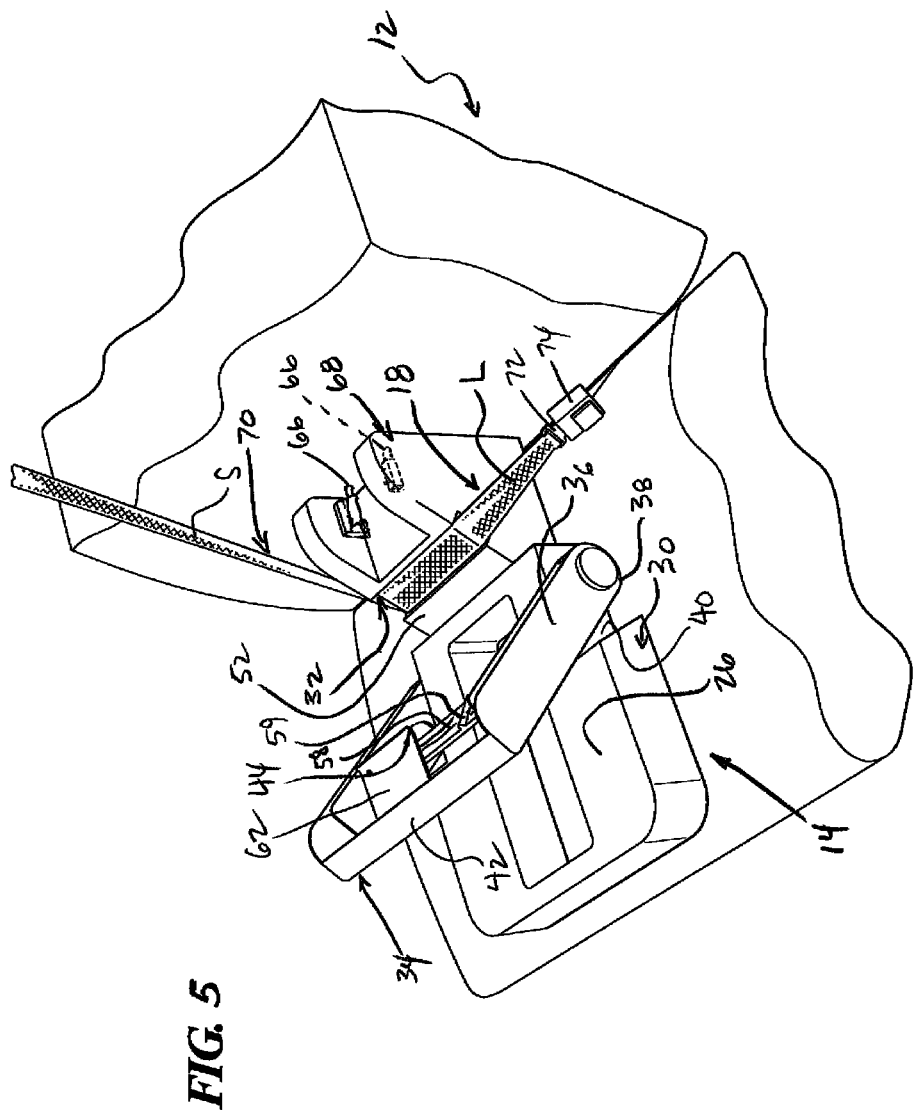
FIG. 5 shows the base of FIG. 3.

The use of the infant car seat base 14 described herein is now described with reference to several of the figures. First, the base 14 can be placed on a vehicle seat 12, as shown in FIG. 5. If the lock-off arm 34 is already in the lock-off position, the belt path 32 is completely inaccessible and the base anchoring strap 18 cannot be placed along the path. Because the lock-off arm is so big in this example, the end user will quickly notice this. The lock-off arm 34 thus should be in the blocking position of FIG. 5 or moved to the blocking position to expose the belt path 32. The base anchoring strap 18 can then be arranged and placed along the belt path 32, as shown in FIG. 5. The base anchoring strap can be a lap belt L (and a connected shoulder strap S, or both) of the vehicle's dedicated seat harness 70, or can be an anchor belt provided with the infant car seat 10. The ends of the anchor belt, though not shown, would then be secured to fixed anchor points provided on the vehicle seat. In this example, the connector end 72 of the safety harness 70 is connected to the buckle housing 74 on the vehicle seat.

Figure 6:
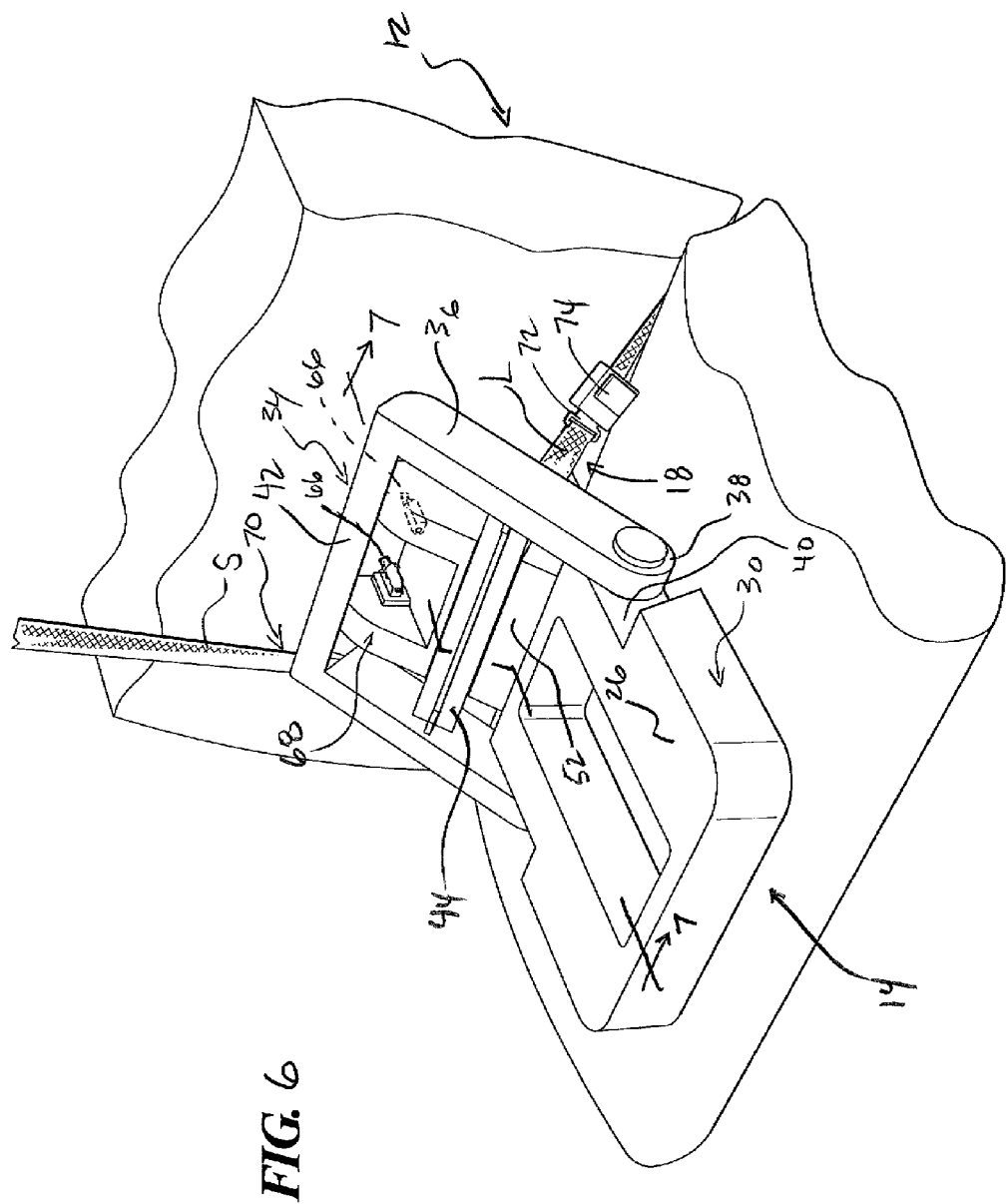
FIG. 6 shows the base of FIG. 5, but with the lock-off arm in the lock-off position.

Once the base anchoring strap 18 is in place and secured, the lock-off arm 34 is pivotally lowered in the direction of the arrow P onto the body 30 of the base 14, as shown in FIG. 6. In this position, the lap belt L and shoulder belt S, i.e., the base anchoring strap 18, are captured between the clamping portion 44 of the lock-off arm 34 and the belt path 32. The protrusion 58 also seats in the slot 56, which puts a kink or bend B in the base anchoring strap 18. This can help retain the relative positioning between the strap and base to tightly secure the base 14 in place on the vehicle seat 12.

The lock-off arm 34 can be configured to contact the base anchoring strap 18 on the infant car seat base 14 along the belt path 32, at least along the sides of the base or along the middle of the base, or both. This can help to guide the straps to a non-linear, kinked, or curved configuration as noted above, helping to retain a secure connection between base 14 and the anchoring strap 18, i.e., the belts L and S. As the lock-off arm 34 is lowered down, it can also displace the base anchoring strap 18 along the sides 40 of the base 14 to cause the entire system to tighten into the vehicle seat creating the snug connection. If desired, the clamping portion 44 of the lock-off arm 34 can also apply pressure against the captured anchoring strap 18 extending across the base 14 to further hold and retain the snug connection.

As shown in FIG. 5, the top side 26 of the infant car seat base 14 is clear when the lock-off arm 34 is in the lock-off position, lowered against the base. The infant seat 16 or carrier can then be placed onto, secured to, or attached to the base, as depicted in FIGS. 1 and 2.

As noted above, the design of the lock-off arm, the base body, and the infant seat can vary and yet still function as intended. The shapes and contours of the parts as well as the contact points can vary within a wide range of options. The geometry could be similar to existing infant car seat base designs, making the belt path route around and through the base. The lock-off arm could then tighten the whole system, but only contact the belts along the sides of the base.

The disclosed infant car seat base and lock-off arm does not require a true secondary operation like conventional side-mount lock-offs. A user will have great difficulty overlooking the lock-off arm and still installing the infant seat or carrier on the base. If the lock-off arm is not in the lock-off position, the user will not be able to place the infant seat on the base. The lock-off arm creates an obvious visual alarm to remind the user to use it to lock-off the base anchoring strap before installing the infant seat or carrier. The disclosed lock-off arm feature also can be created to form one or more deflections in the webbing of the base anchoring strap causing a tighter fit into the seat of the vehicle. The lock-off arm can also clamp down on the base anchoring strap when installed and in the lock-off position to retain the tight fit during use and until released.

Figure 7:
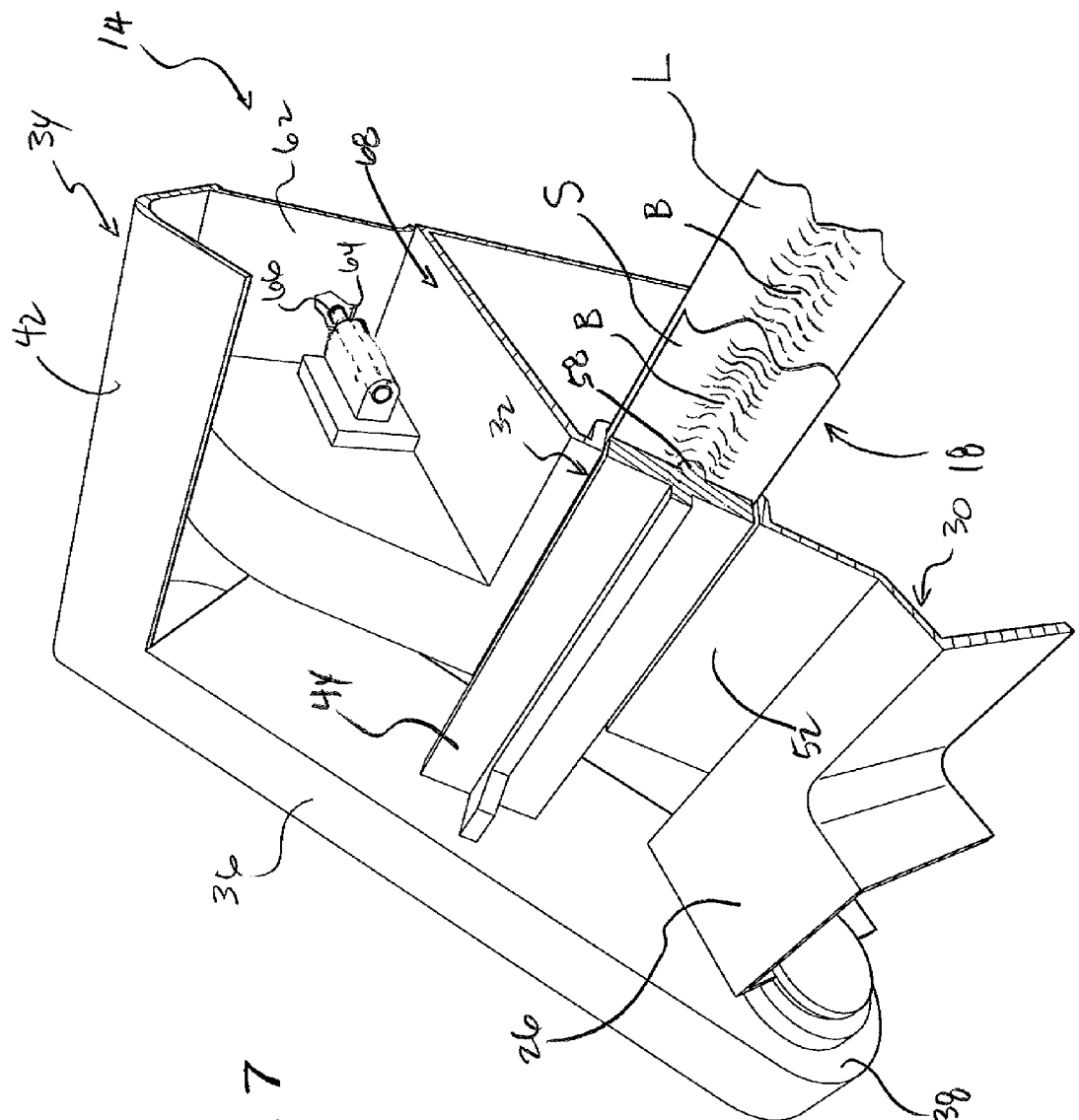
FIG. 7 shows a cross-section of the base taken along lines 7-7 of FIG. 6.

The latch mechanism is depicted in FIGS. 7 and 8 in a latched position. When the lock-off arm is lowered to the lock-off position, the tab 62 will flex away from the pins until the holes 64 align with the pins 66. The tab will then spring back with the pins 66 received in the holes 64. The pins will thus hold the tab in the latched position, securing the lock-off arm in the lock-off position. To release the latching mechanism 60 and raise the lock-off arm to the blocking position, the user can bend the free end of the tab 62 to clear the pins 66 in this example.

An infant car seat base is disclosed herein that has a belt path on the body of the base for an anchoring strap or straps. The base has a lock-off arm that, when in a lock-off position, locks off, captures, or holds the harness strap to or against the belt path. The lock-off arm, when in a blocking position blocks, inhibits, or prevents attachment of an infant carrier or infant seat to the base.

The lock-off arm can be pivotable between the blocking position and the lock-off position. The lock-off arm can instead move in other ways between the two positions, such as slide, cam, rotate, or a combination thereof, or the like. A portion of the lock-off arm, such as a clamping portion or surface facing and contacting the base and/or the anchoring strap, can define part of the belt path of the infant car seat when in the lock-off position. The base and the lock-off arm can have a latching mechanism such as a lock, latch, clasp, retainer, or the like that retains or holds the lock-off arm in the lock-off position until released or disengaged. The lock-off arm can clamp the anchoring strap or straps to the base in a non-linear, curved, or kinked path to aid in retaining the harness strap in position to secure the base. The lock-off arm, when moved to the lock-off position, can also increase tension in the already latched vehicle harness belts or seat anchor belt to further secure the infant car seat base to the vehicle seat.

Although certain infant car seat base, lock-off arm, and lock-off components, features, and methods have been described herein in accordance with the teachings of the present disclosure, the scope of coverage of this patent is not limited thereto. On the contrary, this patent covers all embodiments of the teachings of the disclosure that fairly fall within the scope of permissible equivalents.

What is claimed is:

1. An infant car seat base comprising:
   a body; and
   a belt path on the body configured to accept a base anchoring strap there along;
   a lock-off arm coupled to the body, the lock-off arm movable between a blocking position and a lock-off position and comprising:
      a first member comprising a first end and a distal second end and pivotally connected to the body;
      a second member comprising a third end and a distal fourth end and pivotally connected to the body; and
      a lock-off portion comprising a first side coupled to the first member between the first end and second end and a second side coupled to the second member between the third end and the fourth end and extending between the first member and the second member, wherein at least a portion of the lock-off portion is configured to closely overlie the belt path to capture a base anchoring strap therebetween when the lock-off arm is in the lock-off position,
   wherein the lock-off arm, when in the lock-off position, permits a child seat to be attached to the body, and
   wherein the lock-off arm, when in the blocking position, blocks, inhibits, or prevents attachment of the child seat to the body.

2. The infant car seat base of claim 1, wherein the lock-off arm is pivotable relative to the body between the blocking position and the lock-off position.

3. The infant car seat base of claim 1, wherein the lock-off arm is connected to the body and pivotably raised above the body in the blocking position and pivotably lowered closely adjacent to or against the body in the lock-off position.

4. The infant car seat base of claim 1, wherein the lock-off portion of the lock-off arm closely follows a contour of at least part of the belt path when in the lock-off position.

5. The infant car seat base of claim 1, further comprising:
   a latch mechanism on the infant car seat base configured to releasably secure the lock-off arm in the lock-off position closely adjacent to or against the body.

6. The infant car seat base of claim 5, wherein the lock-off arm further comprises a third member having a fifth end coupled adjacent the second end of the first member and a distal sixth end coupled adjacent the fourth end of the second member, wherein the latch mechanism has a first part on the third member of the lock-off arm that engages a second part on the body when latched and that disengages the second part when released.

7. The infant car seat base of claim 1, wherein the lock-off arm and/or the belt path are configured to capture the base anchoring strap between the body and the lock-off portion and to impart one or more non-linear shapes, curves, bends, or kinks to the base anchoring strap.

8. An infant car seat comprising:
   a base comprising;
      a body;
      a belt path on the body and
      a lock-off arm coupled to the body, the lock-off arm movable between a blocking position and a lock-off position relative to the body, the lock-off arm comprising
         a first member comprising a first end and a distal second end and pivotally connected to the body;

a second member comprising a third end and a distal fourth end and pivotally connected to the body; and a lock-off portion comprising a first side coupled to the first member between the first end and second end and a second side coupled to the second member between the third end and the fourth end and extending between the first member and the second member, wherein at least a portion of the lock-off portion is configured to closely overlie the belt path to capture a base anchoring strap therebetween when the lock-off arm is in the lock-off position; and a child seat attachable to the base, wherein the lock-off arm, when in the lock-off position, permits the child seat to be attached to the body, and wherein the lock-off arm, when in the blocking position, blocks, inhibits, or prevents attachment of the child seat to the body.

9. The infant car seat base of claim 8, wherein the first end of the first member is pivotally connected to the body and the third end of the second member is pivotally connected to the body and a bar extending between the second end of the first member and the fourth end of the second member.

10. The infant car seat base of claim 9, wherein part of the bar of the lock-off arm is pivotably raised above the body in the blocking position and pivotably lowered closely adjacent to or against the body in the lock-off position.

11. The infant car seat base of claim 8, wherein at least a portion of the lock-off portion is configured to contact at least part of the base anchoring strap when in the lock-off position.

12. The infant car seat base of claim 8, further comprising a latch mechanism on the base configured to releasably secure the lock-off arm in the lock-off position closely adjacent to or against the body.

13. The infant car seat base of claim 8, further comprising the base anchoring strap positionable to extend along the belt path on the body when the base is mounted to a vehicle seat.

14. The infant car seat base of claim 13, wherein the lock-off arm and the belt path are configured to capture the base anchoring strap between the body and the lock-off portion and to impart one or more non-linear shapes, curves, bends, or kinks to the base anchoring strap with the lock-off arm in the lock-off position.

15. The infant car seat base of claim 13, wherein the base anchoring strap is a lap belt portion of a safety harness of a vehicle seat.

16. The infant car seat base of claim 13, wherein the base anchoring strap is an anchor belt configured to be clipped or anchored to child seat anchors of a vehicle seat.

17. A method of installing an infant car seat on a vehicle seat, the method comprising the steps of:

positioning a base of the infant car seat on a vehicle seat the base comprising:

a body;

a belt path on the body; and a lock-off arm coupled to the body, the lock-off arm comprising a first member comprising a first end and a distal second end and pivotally connected to the body;

a second member comprising a third end and a distal fourth end and pivotally connected to the body; and a lock-off portion comprising a first side coupled to the first member between the first end and second end and a second side coupled to the second member between the third end and the fourth end and extending between the first member and the second member;

arranging a base anchoring strap along the belt path on the body of the base;

moving the lock-off arm from a blocking position, which prevents, inhibits or blocks attachment of an infant seat to the base, to a lock-off position relative to the body, the base anchoring strap being captured between the belt path on the body and at least a portion of the lock-off portion; and attaching a child seat of the infant car seat to the base.

18. The method of claim 17, further comprising the step of engaging a latch mechanism to secure a free end of the lock-off arm to the base in the lock-off position.

* * * * *